No. 797,517. PATENTED AUG. 15, 1905.
J. H. KIMBALL.
MEASURING INSTRUMENT.
APPLICATION FILED AUG. 25, 1904.

Witnesses.
Harry H. Tilden
Helen Orford

Inventor.
John H. Kimball.
by Albert G. Davis
Att'y

UNITED STATES PATENT OFFICE.

JOHN H. KIMBALL, OF LYNN, MASSACHUSETTS, ASSIGNOR TO GENERAL ELECTRIC COMPANY, A CORPORATION OF NEW YORK.

MEASURING INSTRUMENT.

No. 797,517.          Specification of Letters Patent.          Patented Aug. 15, 1905.

Application filed August 25, 1904. Serial No. 222,086.

*To all whom it may concern:*

Be it known that I, JOHN H. KIMBALL, a citizen of the United States, residing at Lynn, county of Essex, State of Massachusetts, have invented certain new and useful Improvements in Measuring Instruments, of which the following is a specification.

This invention relates to measuring instruments, and more particularly to integrating electric meters of the motor type; and its object is to effect certain improvements in the design and construction of such instruments. In meters of the motor type, especially high-torque induction-meters for measuring alternating currents as constructed prior to my invention, there has been considerable humming and rattling due to vibration and rubbing of the parts. This noise is quite noticeable in induction-meters the moving elements of which rotate at a relatively high speed and is greater in a meter used on high-frequency circuits than in those used on circuits of lower frequency. In all cases it is objectionable. The continual vibration rapidly roughens the surface of the jewel-bearing for the moving element, and thus increases friction and is apt to cause some of the parts to work loose. The object of my invention is to effect certain improvements whereby this rattling is minimized. I accomplish this by yieldingly supporting parts of the instrument which are subjected to the vibrations and by either introducing a non-metallic spacer between two metallic parts which are liable to rub one on the other or making one of the parts of non-metallic rather than metallic material.

The novel features which I believe to be characteristic of my invention will be pointed out with particularity in the claims appended hereto. The details of construction and the mode of operation of my improved measuring instrument will be better understood by reference to the following description, taken in connection with the accompanying drawings, in which—

Figure 1:
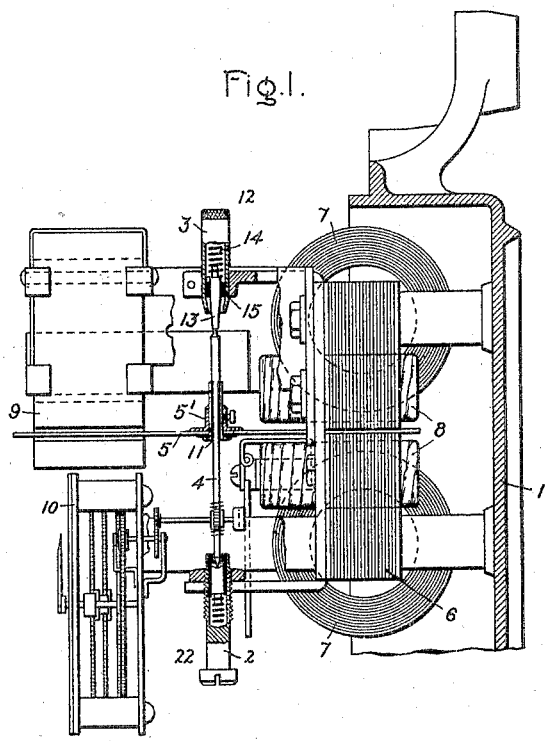
Figure 2:
Figure 3:
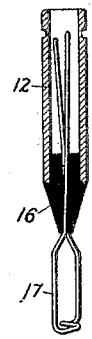
Figure 4:
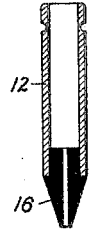
Figure 5:
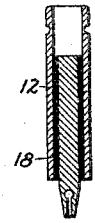
Figure 6:
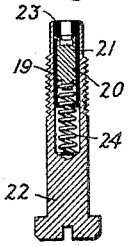
Figure 7:
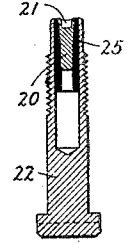

Figure 1 is a sectional elevation, broken away in part, of an induction-meter equipped with my improvements. Fig. 2 is an enlarged sectional view of the upper bearing. Figs. 3, 4, and 5 are sectional views of modified forms of upper bearings. Fig. 6 is an enlarged sectional view of the lower bearing, and Fig. 7 is a sectional view of a modified form of lower bearing.

Referring to the drawings, Fig. 1 shows an integrating induction-wattmeter of a standard make well known among users of electrical apparatus. It consists of a backboard 1, on which are supported bearings 2 3 for a shaft 4, which carries a disk armature 5, of copper or aluminium. The backboard 1 also supports a core 6, built up of soft-iron laminations on which potential-coils 7 7 are wound, consisting of a large number of turns of fine wire and connected in shunt across the lines. The shape of core 6 is such that a small air-gap is formed between projecting poles thereon in which the armature 5 rotates. On opposite sides of the armature 5 series coils 8 8 are provided, each consisting of a small number of turns of large wire and carrying the load-current. The coils 7 7 and 8 8 act upon the disk armature 5 to cause it to rotate in a manner well understood by those skilled in the art. The movement of armature 5 is dampened by a permanent magnet 9, and the rotations of shaft 4 are registered upon a dial 10, as is common in instruments of this type. A more detailed description of these elements of the meter is not considered necessary, as they form no part of my present invention.

In order to reduce noise in induction-meters of the motor type, due to the alternations of the current, to the relatively high speed of rotation, and other causes, it has been proposed to yieldingly support the disk armature upon the meter-shaft, and various means of accomplishing this have been proposed. For this purpose I have provided a tube or sleeve of material, such as rubber, possessing more or less flexibility between the shaft 4 of the meter and the hub 5' of the disk armature 5. This is indicated at 11 in Fig. 1. I find that this sleeve allows a slight movement of the disk 5 relatively to the shaft 4, and thus absorbs vibrations and greatly decreases noise.

In meters as constructed prior to my invention it has been common to reduce the ends of the meter-shaft to sharp points and to support the lower end of the shaft on a spring-supported jewel and the upper end by means of a stationarily-mounted upper bearing-plug provided with a small opening in its end, into which the sharpened end of the shaft extends. I have found that the vibrations of the movable element of a meter may be both axial and lateral and that it is therefore desirable to have the supports for both ends of the meter-shaft yieldable axially and to arrange the upper support so that it is capable of a slight lateral movement. I therefore provide an upper bearing-post 12, Figs. 1 and 2, in which a bearing-plug 13 is positioned by a coiled spring 14, contained within the post. The end of plug 13 is provided with an extension which enters the spring 14 to center the plug relatively to the spring. The plug 13 is smaller than the opening in the hollow bearing-post 12, so that lateral movement is permitted; but in order to cushion and limit this lateral movement and at the same time prevent the rubbing of one metallic surface on another I employ a cylindrical piece 15 of non-metallic material surrounding the plug. I prefer to make the piece 15 of boxwood, though any other non-metallic material which is sufficiently yieldable or elastic to take up the vibrations and cushion the movements of the parts may be employed, if desired. The lower end of plug 13 is provided with an opening therein, as is usual in top bearings, to receive the sharpened end of the meter-shaft. By this construction the plug 13 is slightly yieldable in any direction, vibrations of the moving element of the meter are absorbed, and the rubbing of metallic surfaces against each other is avoided. Fig. 3 shows a modified form of bearing by which the same result is accomplished. The post 12 has a plug of fiber or other non-metallic semi-elastic material 16 inserted in its end, and a flexible wire 17 is held in this plug and provided with a ring in its end to receive the end of the meter-shaft. The upper bearing shown in Fig. 4 is similar to that shown in Fig. 3, except that the wire 17 is omitted and no provision is made for lateral movement of the meter-shaft. In Fig. 5 a metallic bearing-plug is provided and is flexibly supported within the post 12, it being held within a rubber tube 18, which fits tightly within the post 12. In the lower bearings of meters of this type it has been common to provide a jewel set in a metallic plug which is supported on a coiled spring in a hollow bearing-post. In order to avoid noise emanating from this source, I have provided a cylindrical piece 19, Figs. 1 and 6, of fiber or other non-metallic material, surrounding the plug 20, which carries the jewel 21 of the lower bearing, so that the metallic plug does not rub on the post 22. I also provide a fiber washer 23 in the top of the post 22, against which the top of the jewel-plug 20 abuts when it is forced upward by the spring 24, which supports it. The form of lower bearing shown in Fig. 7 differs from that shown in Figs. 1 and 6 in that the jewel-plug 20 is not supported on a coiled spring. In this bearing a rubber tube 25 is provided inside the bearing-post 22, and the plug 20, carrying the jewel 21, is set in this rubber tubing. It is therefore yieldingly supported, and no metallic parts rub one on the other.

I have described my improvements herein as used in an alternating-current induction-meter; but obviously they can be used as well in meters and instruments of other types.

What I claim as new, and desire to secure by Letters Patent of the United States, is—

1. A measuring instrument having a shaft, two hollow bearing-posts each closed at one end suitably mounted within the instrument, a bearing for the shaft in each post, non-metallic material between one of the bearings and its post to dampen vibration, and a coiled spring in each post between the bearing and the closed end of the post to support the bearing and cushion axial movement thereof.

2. A measuring instrument having a shaft, two hollow bearing-posts each closed at one end suitably mounted within the instrument, a bearing for the shaft in each post, a coiled spring in each post between the bearing and the closed end of the post to support the bearing and cushion axial movement thereof, and means permitting a slight lateral movement of one of said bearings.

3. An electric measuring instrument having a shaft, a metallic disk carried thereby, and non-metallic elastic material between the disk and shaft.

4. An electric measuring instrument having a shaft, a metallic disk carried thereby, a hub for said disk, and a sleeve of rubber between the hub and shaft.

5. An electric measuring instrument having its rotary element mounted in yielding bearings, supports for the bearings, and non-metallic material between the bearings and their supports for damping vibration.

6. An electric measuring instrument having a shaft, a bearing therefor, a support for the bearing permitting axial movement thereof, and non-metallic material between the bearing and its support.

7. In a measuring instrument, a shaft and an upper bearing therefor comprising a hollow bearing-post, a bearing-plug carried thereby, and non-metallic material between the plug and post.

8. In a measuring instrument, a shaft and an upper bearing therefor comprising a hollow bearing-post, a bearing-plug carried thereby and extending within the same, and a sleeve of non-metallic yielding material within the bearing-post and surrounding the plug.

9. In a measuring instrument, a shaft and an upper bearing therefor comprising a hollow bearing-post, a bearing-plug carried thereby, and a cylindrical piece of wood within the post and surrounding the plug.

10. In a measuring instrument, a shaft and an upper bearing therefor comprising a hollow bearing-post, a coiled spring within the same, a bearing-plug extending within the post and engaged by said spring, and a cylindrical piece of yielding non-metallic material within the post and surrounding the plug.

11. In a measuring instrument, a shaft and a lower bearing therefor comprising a hollow bearing-post, a bearing-plug within the same, a jewel carried by the plug, and non-metallic material between the post and plug.

12. In a measuring instrument, a shaft and a lower bearing therefor comprising a hollow bearing-post, a sleeve of non-metallic material within the same, a bearing-plug movable within the sleeve, a jewel carried thereby, and a spring supporting the plug.

13. In a measuring instrument, a shaft, and a lower bearing therefor comprising a hollow bearing-post, a plug movable within the same, a jewel carried thereby, and a washer of non-metallic material in the end of said post to limit the upward movement of said plug.

In witness whereof I have hereunto set my hand this 23d day of August, 1904.

JOHN H. KIMBALL.

Witnesses:
JOHN A. McMANUS, Jr.,
DUGALD McK. McKILLOP.